United States Patent [19]

Peterson

[11] Patent Number: 5,032,696
[45] Date of Patent: Jul. 16, 1991

[54] CRASH SENSOR SWITCH

[75] Inventor: Francis C. Peterson, Woodbury, Conn.

[73] Assignee: Buell Industries, Inc., Waterbury, Conn.

[21] Appl. No.: 557,121

[22] Filed: Jul. 23, 1990

[51] Int. Cl.$^5$ ............................................. H01H 35/14
[52] U.S. Cl. ........................... 200/61.45 M; 200/61.53
[58] Field of Search ................ 200/61.45 R, 61.45 M, 200/61.48–61.51, 61.53

[56] References Cited

U.S. PATENT DOCUMENTS

| Re. 28,251 | 11/1974 | Bell | 200/61.53 |
|---|---|---|---|
| 2,997,557 | 8/1961 | Gillmor et al. | 200/61.45 |
| 3,727,575 | 4/1973 | Prachar | 116/114 AH |
| 3,737,599 | 6/1973 | Zuvela | 200/61.45 R |
| 3,812,726 | 5/1974 | Bell | 73/502 |
| 3,835,273 | 9/1974 | Stolarik | 200/61.48 |
| 3,889,130 | 6/1975 | Breed | 307/121 |
| 3,889,232 | 6/1975 | Bell | 340/52 H |
| 3,973,092 | 8/1976 | Breed et al. | 200/61.47 |
| 3,974,350 | 8/1976 | Breed | 200/61.53 |
| 4,092,926 | 6/1978 | Bell | 102/204 |
| 4,116,132 | 9/1978 | Bell | 102/200 |
| 4,157,462 | 6/1979 | Blanchard | 200/61.45 R |
| 4,167,276 | 9/1979 | Bell et al. | 280/731 |
| 4,198,864 | 4/1980 | Breed | 73/492 |
| 4,203,015 | 5/1980 | Tushscherer | 200/61.45 R |
| 4,255,629 | 3/1981 | Bell | 200/61.45 R |
| 4,284,863 | 8/1981 | Breed | 200/61.53 |
| 4,329,549 | 5/1982 | Breed | 200/61.45 M |
| 4,380,692 | 4/1983 | Blanchard et al. | 200/61.45 R |
| 4,536,629 | 8/1985 | Diller | 200/61.45 R |
| 4,580,810 | 4/1986 | Thuen | 280/734 |
| 4,666,182 | 5/1987 | Breed | 280/734 |
| 4,699,400 | 10/1987 | Adams et al. | 280/731 |
| 4,706,990 | 11/1987 | Stevens | 279/734 |
| 4,711,466 | 12/1987 | Breed | 280/741 |
| 4,715,617 | 12/1987 | Breed | 280/731 |
| 4,819,960 | 4/1989 | Breed | 280/734 |
| 4,900,880 | 2/1990 | Breed | 200/61.45 |

Primary Examiner—J. R. Scott
Attorney, Agent, or Firm—St. Onge Steward Johnston & Reens

[57] ABSTRACT

A crash sensor switch having a plunger held in floating suspension by resilient springs is movable from a magnetically biased, switch inoperative position to a switch operative position by crash forces in excess of the magnetic bias force. In one embodiment, the switch is closed to operate a safety device when current flows from one spring through a conductive zone on the plunger and to the other spring.

28 Claims, 3 Drawing Sheets

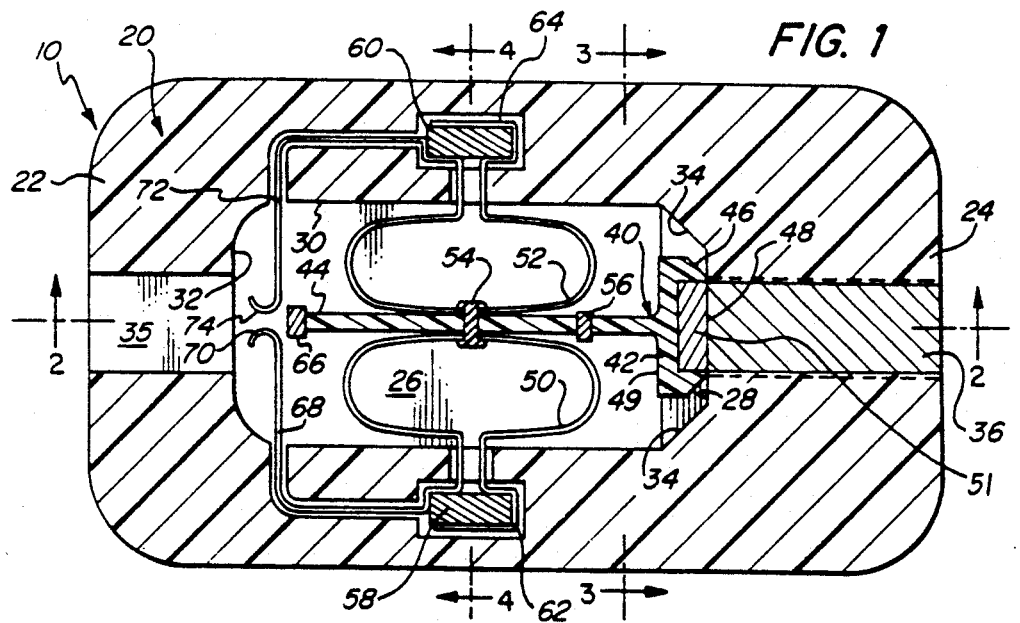
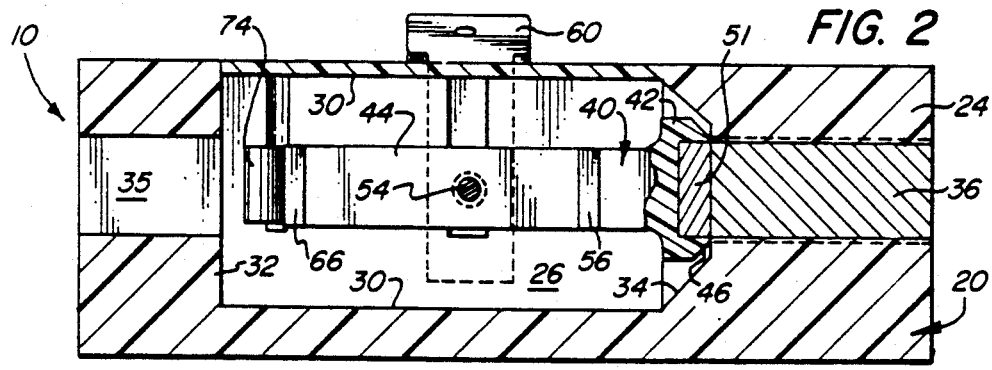
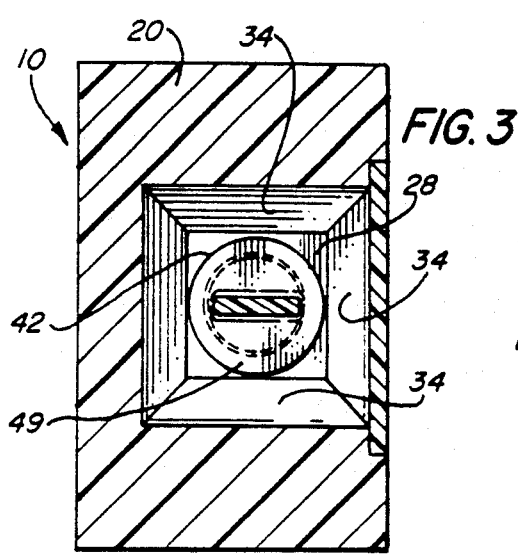
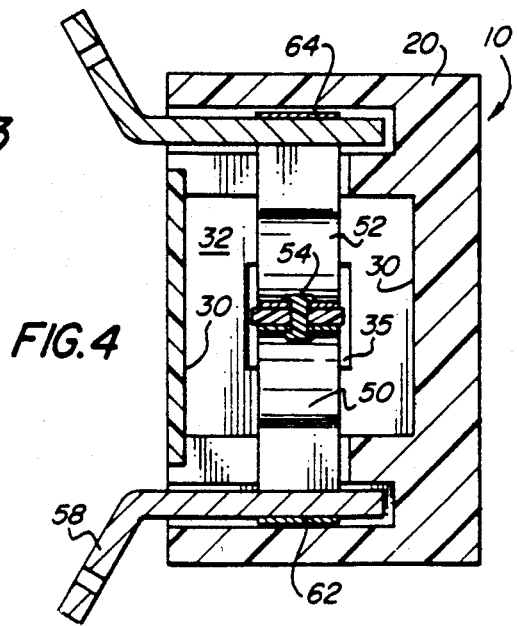

CRASH SENSOR SWITCH

FIELD OF THE INVENTION

The present invention relates to crash sensors and inertial switches, and particularly to crash sensor switches used to trigger vehicle air bags or seat belt tensioners during a collision.

BACKGROUND OF THE INVENTION

Crash sensor switches are used in conjunction with explosives technology to provide vehicle air bags that rapidly inflate in the event of a collision. One type of crash sensor in use today is a ball in tube switch, in which a metal ball is held in place by a magnet, which ball is released during a collision when the deceleration force exceeds the magnetic biasing force holding the ball in the magnet. The released ball, which fits snugly in the tube, travels to a position where it bridges electrical contacts, closing a circuit that activates an air bag. This conventional ball in tube switch is disclosed in Breed, U.S. Pat. No. 4,329,549. The disadvantage of such ball in tube sensors is that they may not trigger the air bag when a diagonal crash occurs. This is due to the need to align the tube with the crash forces in order for crash forces to release the ball from the magnet. This problem is discussed in Breed, U.S. Pat. No. 4,900,880. Because such switch elements are critical, but rarely called upon to operate, the entire ball must be plated with gold to avoid corrosion that would impede switch operation. It is to be appreciated that this can be costly.

SUMMARY OF THE INVENTION

It is an object of the invention to provide a crash sensor switch useful to trigger an air bag or other passenger safety mechanisms in the event of a collision. It is an object of the invention to provide such a crash sensor switch that operates with very low friction, to provide a rapid switch operation responsive to sudden changes in inertial forces. It is an object of the invention to provide a crash sensor switch that can be triggered by crash forces acting diagonally on a vehicle body as well by axial crash forces created by front end or rear end collisions.

A crash sensor switch in accordance with one embodiment of the invention comprises a housing having a chamber, in which is located a plunger, means for biasing the plunger toward a switch inoperative position, resilient means for engaging the plunger and permitting low friction axial and lateral movement of the plunger within a zone of movement, and electrical contact means actuated by axial movement of the plunger to a switch operative position. Inertial forces in excess of the bias force of the biasing means cause the plunger to move axially away from the biasing means to a switch operative position to create an electrical contact to operate the switch.

In one preferred embodiment, the plunger is non-conductive, and the electrical contact means comprises a conductive zone located on the axis of the plunger, which might for example be a conductive metal rivet. The conductive zone is electrically contacted by an electrically conductive path provided in or on the resilient means when the plunger is moved axially against the bias of the biasing means to the switch operative position. The resilient means may in a most preferred embodiment comprise at least one looped electrically conductive spring. The looped spring extends from a side wall of the chamber where it may be connected to an electrical connector. The looped spring is attached to an electrically insulating portion of the plunger. The looped spring rolls along with the plunger when it is moved against the bias of the biasing means and electrically contacts the conductive zone of the plunger to close the switch when the plunger is moved away from the biasing means.

Secondary electrical contact points operative to create a secondary electrical connection are preferably also provided, and may comprise a second electrically conductive zone located on the axis of the plunger and an electrically conductive leaf or leaves for electrically contacting the conductive zone of the plunger when the plunger is moved axially against the bias of the biasing means to the switch operative position.

The resilient means permits lateral movement of the plunger so that the switch may be triggered by forces acting diagonally to the axis of the plunger. The response to diagonal forces is enhanced by providing angled walls between the rearward wall and the side walls of the housing chamber, and on the base portion of the plunger.

In an alternative embodiment, the plunger comprises an electrically conductive element electrically connected to the resilient means, and an electrical contact means for receiving an end of the plunger when the plunger is moved to its switch operative position are provided to close the switch.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 1 is a top cross-sectional view of an embodiment of a crash sensor switch in accordance with the invention showing the switch in the open position.

FIG. 2 is a side cross-sectional view of the crash sensor switch of FIG. 1 along the line 2—2.

FIG. 3 is an end cross-sectional view of the crash sensor switch of FIG. 1 along the line 3—3.

FIG. 4 is an end cross-sectional view of the crash sensor switch of FIG. 1 along the line 4—4.

DETAILED DESCRIPTION OF THE PREFERRED EMBODIMENT

Figure 5:
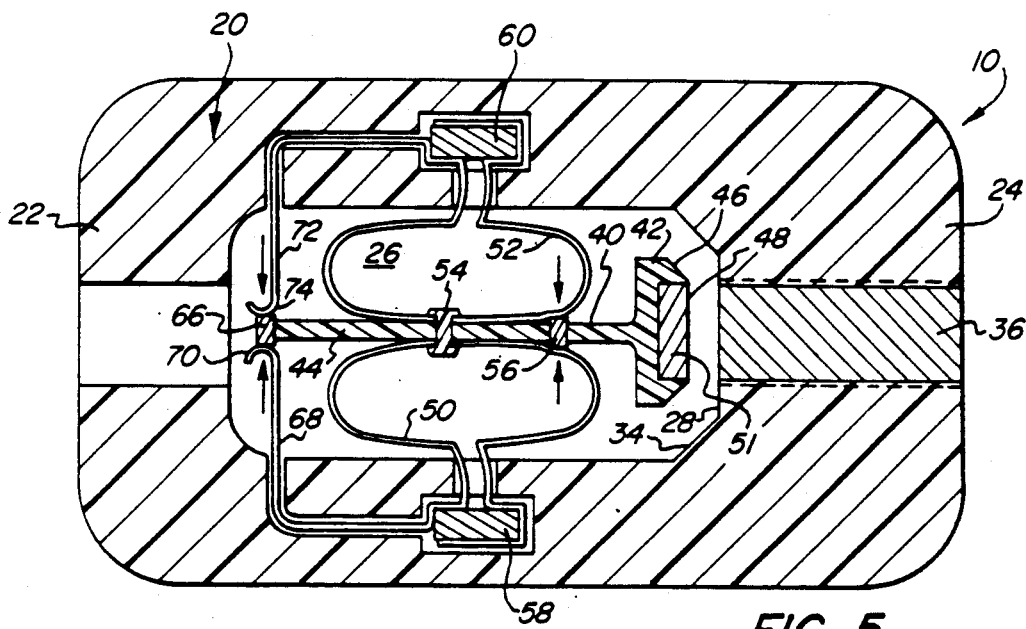
FIG. 5 is a top cross-sectional view of the crash sensor switch of FIG. 1 showing the switch in the closed position.

Referring now to FIGS. 1–6, a first embodiment of a crash sensor is shown generally at 10. Although the intended principal use of the switch 10 is for use as a trigger of safety devices in a collision, it is also susceptible of many other uses, and the description "crash sensor switch" is not meant to limit its use, or the scope of the invention.

Crash sensor 10 is contained in a housing 20 which is adapted to be mounted in a vehicle with the housing end 22 pointed at the front end of the vehicle and the housing end 24 oriented at the rear end of the vehicle. This housing 20 will be generally aligned with the longitudinal axis of the vehicle. Housing 20 has contained within it a chamber 26. Chamber 26 has a rearward wall 28, side walls 30, and a forward wall 32. In the FIGURES, the walls 28, 30 and 32 are rectangular such that chamber 26 is a rectangular volume. However, the chamber 26 may have any number of shapes including a cylindrical volume. It is desirable however, that at least the rearward wall 28 be generally symmetric, for example in FIG. 3, rearward wall 28 is square, such that the switch 10 will have the desired consistent response during a diagonal collision. Angled walls 34 are provided in the chamber 26 between the rearward wall 28 and the side walls 30. Angled walls 34 are provided such that the intersection between rearward walls 28 and the side walls 30 are sloped, with the rearward wall 28 tapering into the other walls. Thus the angled walls 34 may be planar walls set on an angle as shown in the FIGURES, or curved surfaces, which may be tangential to either or both the side walls 30 and rearward wall 28. If desired, an aperture 35 may be provided in forward wall 32.

A plunger 40 is provided in the chamber 26. Plunger 40 is made of an electrically non-conductive material, preferably a polymeric material. Plunger 40 has a longitudinal axis extending from the rearward wall 28 to the forward wall 32. The axis of plunger 40 will preferably be generally aligned with the longitudinal axis of the vehicle when crash sensor switch 10 is mounted in a vehicle. Plunger 40 has a base portion 42 and a stem portion 44. Base portion 42 is preferably round, although it may be square, rectangular, or otherwise shaped. Preferably the base portion 42 has a lesser perimeter than the rearward wall 28 so that it has a degree of freedom of movement so that it will not be trapped by the intersection of the rearward wall 28 with the angled walls 34. Base portion 42 has a rearward wall 48 and a base forward wall 49 from which extends stem portion 44. Preferably, angled side walls 46 are provided between the base rearward wall 48 and base forward wall 49. Preferably, the angle of the angled side walls 46 is sufficient to minimize the possibility of the base portion 42 being trapped by the intersection of the chamber rearward wall 28 with the angled walls 34. There is preferably a substantial clearance between the base portion 42 and the chamber side walls 30. Stem portion 44 is shown as having a rectangular cross-section.

The angled side walls 34 of chamber 26 provide crash sensor switch 10 with enhanced sensitivity to diagonal crash forces, since the plunger 40 will have an improved ability to be released, and to translate the diagonal forces into axial movement, as set forth hereafter. The angled side walls 34 guide plunger 10 to enhance the translation of diagonal to axial movement. The base angled walls 46 also improve the sensitivity to diagonal crashes by eliminating a corner edge that might catch on the intersection between the rearward wall 28 and side walls 30.

Means for biasing the plunger 40 toward a switch inoperative position are provided and preferably comprise a fixed magnet 36 retained in the housing 20, with one end of the magnet 36 located adjacent the rearward wall 28. Preferably the magnet 36 end is flush with the surface of rearward wall 28. The plunger base portion 42 is magnetically engageable. A magnetically engageable base portion 42 may be provided by mounting a ferrous material 51 in a chamber in the base portion 42.

Other means for biasing plunger 40 might include releasable latches or springs. However, a magnetic biasing means is preferable as it provides a minimum of mechanical parts that could interfere with the operation of the switch or fail in use. In addition, a magnetic biasing means will easily reset itself after the switch 10 is triggered in a crash.

The practitioner will select a magnet 36 of a certain strength in combination with a plunger 40 of a certain mass, such that the plunger 40 will be released from the magnet 36 at a selected deceleration, to cause the switch 10 to operate.

Resilient means for engaging the plunger and permitting low friction axial and lateral movement of the plunger within a zone of movement are provided. These are shown in FIGS. 1-6 as two looped springs 50 and 52. Looped springs 50 and 52 are preferably formed of a spring steel or the like. Looped springs extend from a side wall 30 of the chamber 26 and are secured at one end to an electrically insulating portion in the middle of plunger stem 44. The springs 50 and 52 may be secured by a non conductive plastic rivet 54 as shown in the drawings, or a plurality of such rivets. Alternatively, other fastening means such as a clip or latch may be used. In some instances, a clip may be preferable since the holes needed to fasten with a rivet may weaken the spring loops 50 or 52.

In the preferred orientation, the housing and spring loops are arranged so that the spring loops 50 and 52 are located on lateral sides of the plunger 40 rather than above and below the plunger 40. The plunger thus floats inside chamber 26 and is able to provide rapid operation of switch 10.

It is to be appreciated that the desired spring loops 50 and 52 will permit the plunger 40 to rapidly move within a zone of movement when released from magnet 36 by collision forces. The spring loops 50 and 52 permit nearly frictionless movement of the plunger 40 within the zone of movement, so that the crash sensor switch 10 will have a rapid response time.

Electrical contact means actuated by axial movement of the plunger to a switch operative position are provided to make the switch 10 operate when the plunger 40 is released from magnet 36.

In the embodiment of FIGS. 1-6, the plunger 40 is provided with a conductive zone 56 located on the axis of the plunger 40 to make the required electrical contact. Conductive zone 56 is most preferably a conductive metal rivet having head portions extending slightly above the plane of the plunger stem 44. Such a rivet might desirably be a copper or silver rivet, and its head portions might be gold plated. However, conductive zone 56 may take other forms, and might be integrally molded into the plunger 40 or secured to the plunger after manufacture of the plunger.

The plunger conductive zone 56 is the contact point for closing of the switch 10. It is electrically contacted by an electrically conductive path provided in or on spring loops 50 and 52 when the plunger is moved from the switch inoperative position shown in FIG. 1 to the switch operative position shown in FIG. 6. As noted, the spring loops 50 and 52 are preferably made of spring steel, which is an electrically conductive material, and thus the electrically conductive path will comprise the spring loops 50 and 52 themselves. If desired, the spring loops 50 and 52 may be plated with gold to reduce the possibility of corrosion in the electrical contact areas.

Figure 6:
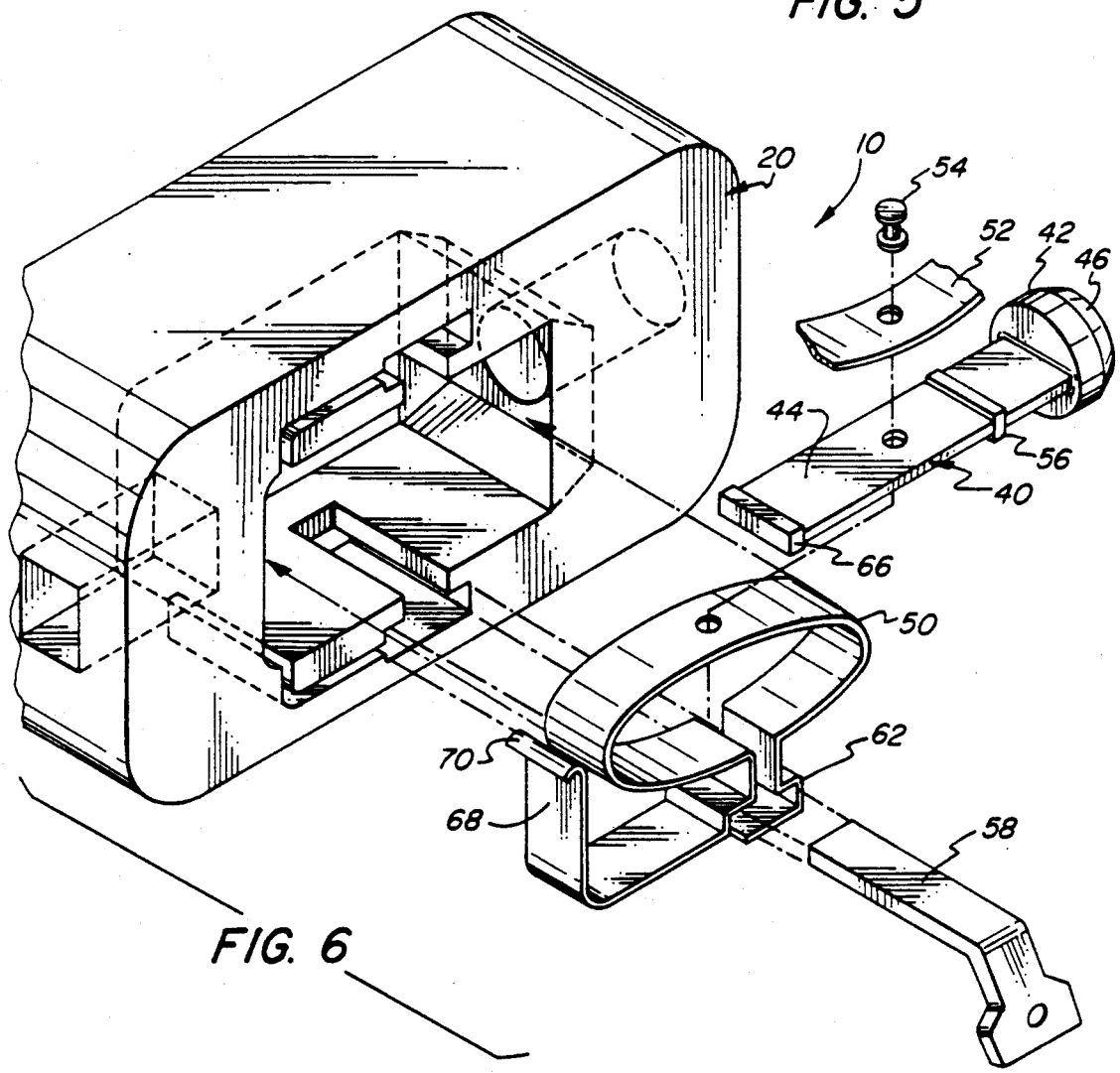
FIG. 6 is an exploded perspective view of the crash sensor switch of FIG. 1.

Typically, one of the spring loops 50 and 52 is electrically connected to a current source and the other spring loop is electrically connected to an mechanism that will be operated when the switch 10 is in its closed, operative position as shown in FIG. 6. Such mechanisms may include an inflation initiator in an airbag, a seat belt tensioner, or other devices desirably operated when there is deceleration in excess of the biasing force. Such devices might conceivably also include devices for shutting off the flow of fuel to a vehicle engine.

For convenience, the spring loops 50 and 52 are electrically connected to electrical connectors such as spade terminals 58 and 60. Wires leading to the current source and the mechanism to be operated may be mounted on the spade terminals 58 and 60.

The looped springs desirably use the connection with the spade terminals 58 and 60 to anchor the looped springs to the walls of the housing 20. As can be seen in the Figures, the looped springs have anchoring ends 62 and 64 respectively that surround the spade terminals 58 and 60.

Secondary electrical contact points operative to create a secondary electrical connection are preferably also provided, and may comprise a second electrically conductive zone 66 located on end of stem 44 of plunger 40. This second electrically conductive zone is received by the electrically conductive leaves 68 and 72 when the plunger 40 is released from magnet 36. First leaf 68 has a first leaf end 70 and second leaf 72 has a second leaf end 74 separated from first leaf end 70 by a gap sufficient to prevent an electrical connection therebetween. The second conductive zone 66 of plunger 40 is at a position on the plunger stem 44 so as to bridge the gap and form an electrical connection between the first and second leaf ends 70 and 74 when impact forces release the plunger. The secondary electrical contact may be electrically connected to the spade terminals 58 and 60 such that the secondary electrical contact points lead to the same wiring to the current source and mechanism to be activated, or the secondary electrical contact may be separately wired to the current source and mechanism through separate terminals for redundant operation.

The operation of the crash sensor switch is shown by a comparison of FIGS. 1 and 6. In FIG. 1, the switch 10 is in the inoperative position, with the plunger 40 held against the rearward wall 28 of chamber 26. No electrical connection is made, since the springs 50 and 52 are in contact only with the electrically insulating rivet 54 and the middle portion of the electrically insulating stem 44 of plunger 40. In addition, the second electrically conductive zone 66 is not in contact with the leaves 68 and 72. In FIG. 6, the switch is in the operative position. As can be seen, the plunger 40 is released from magnet 36, and the looped springs 50 and 52 have rolled along with the plunger 40, guiding the plunger. The springs 50 and 52 roll along the surface of stem 44 until they contact the first electrically conductive zone 56, closing the switch 10 by making an electrical connection between springs 50 and 52. In addition, a secondary switch closing occurs by the placement of the second conductive zone 66 of plunger 40 between the leaf ends 70 and 74 to make an electrical connection therebetween.

Figure 7:
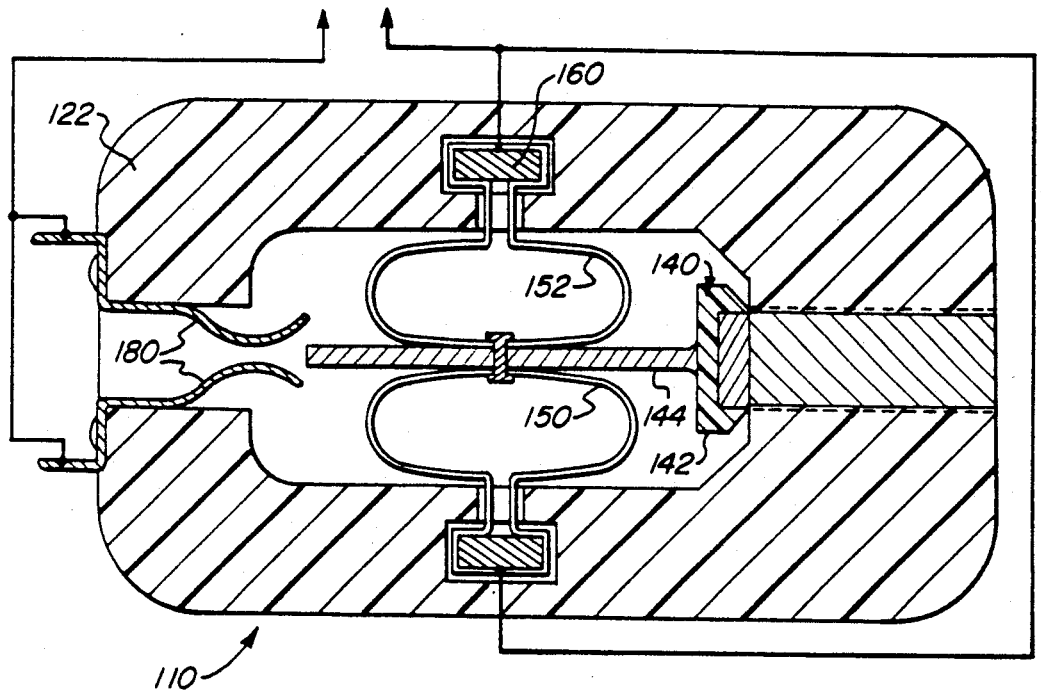
FIG. 7 is a top cross-sectional view of another embodiment of a crash sensor switch in accordance with the invention showing the switch in the open position.
Figure 8:
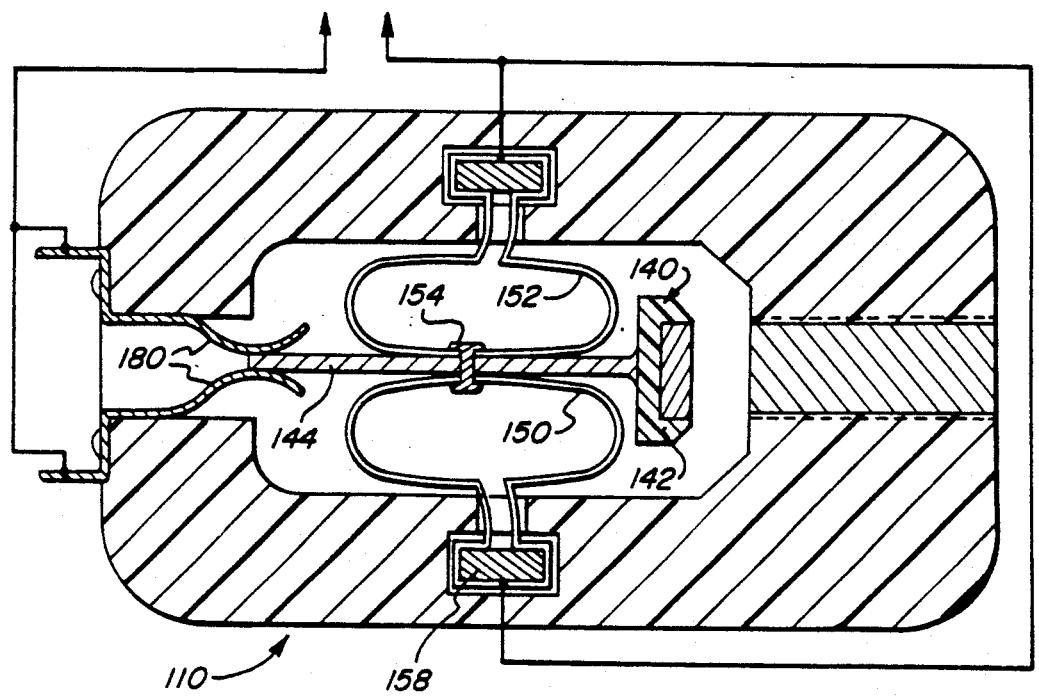
FIG. 8 is a top cross-sectional view of the crash sensor switch of FIG. 7 showing the switch in the closed position.

Referring now to FIGS. 7-8, a second embodiment of a crash sensor switch is shown generally as 110. Switch 110 is substantially as described in reference to switch 10 in FIGS. 1-6, except that the switch closing is achieved by the contacting of the plunger 140 with jaws 180. In particular, plunger 140 is electrically conductive, and it is secured to and in electrical connection with spring loops 150 and 152 at all times. Thus, the plunger 140 may be secured to the spring loops 150 and 152 by a conductive metal rivet 154, or a plurality of such rivets 154, or by other conductive fastening means. Preferably, the electrically conductive portion of plunger 140 is limited to the plunger stem portion 144, with the plunger base portion 142 made of an electrically insulating material so that there is no alternative electrical path to ground when switch 10 is operative.

Spring loops 150 and 152 are electrically connected to one side of the circuit such as a current source. This connection may be by way of terminals such as spade terminals 158 and 160. Jaws 180 are electrically connected to the other side of the circuit, such as the mechanism to be activated. Jaws 180 are formed of a resilient conductive material, and are separated sufficiently to receive and be in electrical contact with the end of plunger stem 144 when switch 110 is operated. It is to be appreciated that other possible adaptions of the jaws of this embodiment of the invention would include leaf elements oriented as discussed in reference to leaf elements 68 and 72 of FIGS. 1-6, or planar contact surface perpendicular to the axis plunger 140, as well as other electrically connecting means.

The operation of the embodiment of the crash sensor switch 110 is shown by a comparison of FIGS. 7 and 8. In FIG. 7, switch 110 is in its inoperative position, with the end of plunger stem 144 separated from jaws 180. Thus there is no electrical connection. In FIG. 8, switch 110 is in its operative position with an electrical connection made between the plunger stem 144 and the jaws 180.

The present invention provides a reliable crash sensor switch that is sensitive both to axial and diagonal impacts. It provides a switch with rapid operation due to the very low friction in the movement of the plunger to close the switch. The foregoing specification describes several preferred embodiments of the invention, but it is not limiting.

I claim:

1. In a crash sensor switch comprising: a housing having a chamber, said chamber having a forward wall, a rearward wall, and side walls, the improvement which comprises:

a plunger formed of an electrically insulating material and having a longitudinal axis and an electrically conductive zone;

means for biasing said plunger toward a switch inoperative position;

resilient means for engaging said plunger and permitting low friction axial movement of said plunger within a zone of movement, said resilient means having an electrically conductive path for electrically contacting said conductive zone of said plunger when said plunger is moved axially against the bias of said biasing means to a switch operative position, said resilient means comprising at least one looped electrically conductive spring, said looped spring extending from a side wall of said chamber and being attached to said electrically insulating portion of said plunger, said looped spring being rollable to permit electrical contact between said conductive zone of said plunger and said electrically conductive spring when said plunger is moved against the bias of said biasing means, said electrically conductive zone of said plunger being electrically connected to a device operated by operation of said switch;

whereby inertial forces in excess of the bias force of said biasing means cause said plunger to move axially away from said biasing means to create an electrical contact to operate said switch.

2. The improvement in a crash sensor switch in accordance with claim 1, further comprising secondary electrical contact points operative to create an electrical connection therebetween when said plunger is in said switch operative position.

3. The improvement in a crash sensor switch in accordance with claim 2, wherein said secondary electrical contact points comprise a second electrically conductive zone located on the axis of said plunger and an electrically conductive path for electrically contacting said second electrically conductive zone of said plunger when said plunger is moved axially against the bias of said biasing means to said switch operative position.

4. The improvement in a crash sensor switch in accordance with claim 1, wherein said resilient means permits lateral movement of said plunger.

5. The improvement in a crash sensor switch in accordance with claim 4, further comprising angled walls between said rearward wall and said side walls of said chamber.

6. A crash sensor switch, comprising:
a chamber having a rearward wall, and side walls;
a non-conductive plunger having a longitudinal axis and an electrically conductive zone located along a portion of said axis;
means for biasing said plunger toward said rearward end of said chamber in a switch inoperative position;
resilient spring means for engaging said plunger and permitting low friction axial and lateral movement of said plunger within a zone of movement, said spring means having an electrically conductive path for electrically contacting said conductive zone of said plunger when said plunger is moved against the bias of said biasing means to a switch operative position;
whereby inertial forces in excess of the bias force of said biasing means can act on said plunger to cause said plunger to move axially away from said biasing means to a switch operative position where an electrical connection is created between said conductive path of said spring means and said conductive zone of said plunger.

7. A crash sensor switch in accordance with claim 6, further comprising angled walls between said rearward wall and said side walls of said chamber.

8. A crash sensor switch in accordance with claim 6, wherein said resilient spring means comprise two looped spring bands extending from two side walls of said chamber, said loops being rollable to electrically contact said conductive zone of said plunger when said plunger is moved forwardly away from its biased position.

9. A crash sensor in accordance with claim 8, wherein spring bands are formed of an electrically conductive metal.

10. A crash sensor switch in accordance with claim 6, further comprising:

secondary electrical contact points separated from each other and a secondary electrical conductive zone on said plunger operative to create an electrical connection between said secondary contact points when said plunger is in said switch operative position.

11. A crash sensor switch in accordance with claim 10, wherein said secondary electrical contact points comprise:
a first electrically conductive leaf having a first leaf end;
a second electrically conductive leaf having a second leaf end separated from said first leaf end by a gap sufficient to prevent an electrical connection therebetween;
a second conductive zone formed on said plunger, said second conductive zone being located to bridge said gap and form an electrical connection between said first and second leaf ends when said plunger is moved away from its biased position.

12. A crash sensor switch in accordance with claim 6, wherein said biasing means comprises a magnet located in said rearward wall of said chamber and a magnetically engageable base portion of said plunger located at a rearward end of said plunger.

13. A crash sensor switch, comprising:
a chamber having a rearward wall, and side walls;
a plunger formed of an electrically insulating material, said plunger having an axis and a conductive zone located across a portion of said axis;
means for biasing said plunger toward said rearward end of said chamber;
first resilient spring means formed of a conductive material secured to the electrically insulating portion of said plunger for permitting axial movement of said plunger in said chamber and contacting said conductive zone of said plunger when said plunger is moved against the bias of said biasing means;
second resilient spring means formed of a conductive material secured to the electrically insulating portion of said plunger for permitting axial movement of said plunger in said chamber and contacting said conductive zone of said plunger when said plunger is moved against the bias of said biasing means;
whereby inertial forces in excess of the bias force of said biasing means can cause said plunger to move axially away from said biasing means to create an electrical connection between said first resilient spring means and said second resilient spring means through said conductive zone of said plunger.

14. A crash sensor switch in accordance with claim 13, further comprising angled walls between said rearward wall and said side walls of said chamber.

15. A crash sensor switch in accordance with claim 14, wherein said first and second resilient spring means each comprise a spring band extending from a side wall of said chamber and being looped rearwardly toward said chamber rearward wall and forwardly to secure each said spring band to said plunger.

16. A crash sensor switch in accordance with claim 15, further comprising:
a first electrically conductive leaf having a first leaf end;
a second electrically conductive leaf having a second leaf end separated from said first leaf end by a gap sufficient to prevent an electrical connection therebetween;

a second conductive zone formed on said plunger, said second conductive zone being located to bridge said gap and form an electrical connection between said first and second leaf ends when said plunger is moved away from its biased position.

17. A crash sensor switch in accordance with claim 16, wherein said first electrically conductive leaf is electrically connected to said first resilient spring means, and said second electrically conductive leaf is electrically connected to said second resilient spring means.

18. A crash sensor switch in accordance with claim 15, wherein said biasing means comprises a magnet located in said rearward wall of said chamber and a magnetically engageable base portion of said plunger located at a rearward end of said plunger.

19. A crash sensor switch, comprising:
a chamber having a forward wall, a rearward wall, and side walls;
an electrically insulating plunger having a base located at its rearward end and a stem extending therefrom, said base being magnetically engageable, said stem having a conductive zone in a portion thereof;
a magnet located in said rearward wall of said chamber for biasing said plunger in position against said rearward wall;
a first loop of a resilient conductive spring, said first loop being secured to a side wall of said chamber and to the electrically insulating portion of said plunger, and being electrically connected to a first electrical connector, said first loop being in electrically insulating contact with said plunger when said plunger is in its magnetically biased position, said loop being rollable to electrically contact said conductive zone of said plunger stem when said plunger is moved forwardly away from its magnetically biased position;
a second loop of a resilient conductive spring, said second loop being secured to a side wall of said chamber and to the electrically insulating portion of said plunger opposite from said first loop, and being electrically connected to a second electrical connector, said second loop being in electrically insulating contact with said plunger when said plunger is in its magnetically biased position, said second loop being rollable to electrically contact said conductive zone of said plunger stem when said plunger is moved forwardly away from its magnetically biased position;
whereby inertial forces in excess of the magnet bias force can cause said plunger to move axially away from said magnet to create an electrical connection between said first and second loops through said conductive zone of said plunger.

20. A crash sensor switch in accordance with claim 19, further comprising:
a first electrically conductive leaf having a first leaf end;
a second electrically conductive leaf having a second leaf end separated from said first leaf end by a gap sufficient to prevent an electrical connection therebetween;
a second conductive zone formed on said plunger, said second conductive zone being located to bridge said gap and form an electrical connection between said first and second leaf ends when said plunger is moved away from its magnetically biased position.

21. A crash sensor switch in accordance with claim 20, wherein said first electrically conductive leaf is electrically connected to said first resilient conductive spring, and said second electrically conductive leaf is electrically connected to said second resilient conductive spring.

22. A crash sensor switch in accordance with claim 20 wherein said plunger conductive zone is located between said plunger base and said connections between said plunger and said first and second loops, and said plunger second conductive zone is located forwardly of said connections between said plunger and said first and second loops.

23. A crash sensor switch in accordance with claim 19, further comprising angled walls between said rearward wall and said side walls of said chamber.

24. A crash sensor switch in accordance with claim 25, wherein said base further comprises a base rearward wall for mating with said magnet, a base forward wall from which extends said stem, and angled base side walls joining said base rearward and forward walls.

25. A crash sensor switch in accordance with claim 24, wherein said base rearward wall is circular.

26. A crash sensor switch in accordance with claim 26 wherein said first loop and first leaf comprise a unitary strip of formed metal, and said second loop and second leaf comprise another unitary strip of formed metal.

27. A crash sensor switch in accordance with claim 30 wherein said first loop and first leaf comprise separate strips of formed metal, and said second loop and second leaf comprise separate strips of formed metal.

28. A crash sensor switch, comprising:
a chamber having a rearward wall, and side walls, and having angled walls between said rearward wall and said side walls;
an electrically insulating plunger having a base located at its rearward end and a stem extending therefrom, said base having a magnetically engageable rearward wall and a base forward wall from which extends said stem, and angled base side walls joining said base rearward and forward walls, said stem having separated first and second conductive zones;
a magnet located in said rearward wall of said chamber for biasing said plunger in position against said rearward wall;
a first loop of a resilient conductive spring, said first loop being secured to a side wall of said chamber and to the electrically insulating portion of said plunger, and being electrically connected to a first electrical connector, said first loop being in electrically insulating contact with said plunger when said plunger is in its magnetically biased position, said loop being rollable to electrically contact said first conductive zone of said plunger stem when said plunger is moved forwardly away from its magnetically biased position;
a second loop of a resilient conductive spring, said second loop being secured to a side wall of said chamber and to the electrically insulating portion of said plunger opposite from said first loop, and being electrically connected to a second electrical connector, said second loop being in electrically insulating contact with said plunger when said plunger is in its magnetically biased position, said second loop being rollable to electrically contact said first conductive zone of said plunger stem when said plunger is moved forwardly away from its magnetically biased position;

said plunger first conductive zone being located between said plunger base and said connections between said plunger and said first and second loops;

a first electrically conductive leaf electrically connected to said first resilient conductive spring, said first leaf having a first leaf end;

a second electrically conductive leaf electrically connected to said second resilient conductive spring, said second leaf having a second leaf end separated from said first leaf end by a gap sufficient to prevent an electrical connection therebetween;

said second conductive zone of said plunger being located to bridge said gap and form an electrical connection between said first and second leaf ends when said plunger is moved away from its magnetically biased position;

said plunger second conductive zone being located forwardly of said connections between said plunger and said first and second loops;

whereby inertial forces in excess of the magnet bias force can cause said plunger to move axially away from said magnet to create an electrical connection between said first and second loops through said conductive zone of said plunger and between said first and second leaf ends through said second conductive zone of said plunger.

* * * * *